(12) United States Patent
Jarisch

(10) Patent No.: US 11,597,587 B2
(45) Date of Patent: Mar. 7, 2023

(54) CAPSULE FOR PREPARING EDIBLE COMPOSITIONS

(71) Applicant: NESTEC S.A., Vevey (CH)

(72) Inventor: Christian Jarisch, Lutry (CH)

(73) Assignee: Societe des Produits Nestle S.A., Vevey (CH)

( * ) Notice: Subject to any disclaimer, the term of this patent is extended or adjusted under 35 U.S.C. 154(b) by 298 days.

(21) Appl. No.: 14/898,802

(22) PCT Filed: Jun. 17, 2014

(86) PCT No.: PCT/EP2014/062633
§ 371 (c)(1),
(2) Date: Dec. 16, 2015

(87) PCT Pub. No.: WO2014/206799
PCT Pub. Date: Dec. 31, 2014

(65) Prior Publication Data
US 2016/0130076 A1    May 12, 2016

(30) Foreign Application Priority Data

Jun. 24, 2013  (EP) .................................... 13173326

(51) Int. Cl.
*A47J 31/46*  (2006.01)
*A47J 31/44*  (2006.01)
*B65D 85/804*  (2006.01)

(52) U.S. Cl.
CPC ...... *B65D 85/8058* (2020.05); *A47J 31/4492* (2013.01); *B65D 2203/00* (2013.01)

(58) Field of Classification Search
CPC .................... B65D 85/8043; A47J 31/4492
USPC ..... 99/323, 295, 289 R, 279, 286, 287, 285, 99/302 R, 302 C, 318; 426/77, 80, 81, 426/115, 394, 87
See application file for complete search history.

(56) References Cited

U.S. PATENT DOCUMENTS

| 4,136,202 | A  |   | 1/1979  | Favre |
| 7,673,558 | B2 |   | 3/2010  | Panesar et al. |
| 9,162,815 | B2 | * | 10/2015 | Yoakim .............. B65D 85/8043 |
| 9,226,611 | B2 | * | 1/2016  | Yoakim .................. A47J 31/22 |
| 2010/0078480 | A1 | * | 4/2010 | Aker ................ G06K 19/06009 |
|   |   |   |   | 235/462.08 |

(Continued)

FOREIGN PATENT DOCUMENTS

| EP | 242556 B1 | 3/1990 |
| EP | 1472156 B1 | 3/2006 |

(Continued)

*Primary Examiner* — Helena Kosanovic
*Assistant Examiner* — Ahmad Abdel-Rahman
(74) *Attorney, Agent, or Firm* — K&L Gates LLP

(57) ABSTRACT

The present invention concerns a capsule (1) for food or beverage preparation having a capsule body defining a compartment for containing a precursor ingredient, the capsule body being a volume with one symmetry plane or one symmetry axis so as to define at least two symmetrical volume segments, the capsule (1) being suitable for coupling any of its body segments to a food or beverage preparation machine (14) for injection of a mixing ingredient from the machine within the capsule, characterized in that the capsule (1) comprises at least two codes (15) each located in one body segment, each code (15) carrying two different alternative values of a same beverage preparation setting.

1 Claim, 5 Drawing Sheets

(56) References Cited

U.S. PATENT DOCUMENTS

| | | | | |
|---|---|---|---|---|
| 2010/0203198 | A1* | 8/2010 | Yoakim | A47J 31/22 |
| | | | | 426/80 |
| 2011/0041702 | A1* | 2/2011 | Yoakim | B65D 85/8043 |
| | | | | 99/302 R |
| 2011/0217421 | A1* | 9/2011 | Perentes | A47J 31/22 |
| | | | | 426/80 |
| 2011/0308399 | A1* | 12/2011 | Jung | A47J 31/0668 |
| | | | | 99/295 |
| 2012/0058226 | A1* | 3/2012 | Winkler | A47J 31/3695 |
| | | | | 426/79 |
| 2013/0014648 | A1* | 1/2013 | Rognon | A47J 31/3623 |
| | | | | 99/280 |
| 2015/0238044 | A1* | 8/2015 | Halliday | A47J 31/4407 |
| | | | | 99/283 |
| 2015/0238045 | A1* | 8/2015 | Hansen | A47J 31/369 |
| | | | | 99/295 |

FOREIGN PATENT DOCUMENTS

| | | | | |
|---|---|---|---|---|
| EP | 1784344 | B1 | 4/2009 | |
| EP | 1967100 | B1 | 5/2009 | |
| EP | 2062831 | A2 | 5/2009 | |
| EP | 2162653 | B1 | 6/2011 | |
| EP | 2345351 | | 7/2011 | |
| EP | 2345351 | A1 * | 7/2011 | A47J 31/4492 |
| EP | 2345351 | A1 * | 7/2011 | A47J 31/3623 |
| EP | 2345352 | | 7/2011 | |
| EP | 2481330 | | 8/2012 | |
| GB | 2485575 | A * | 5/2012 | A47J 31/0689 |
| GB | 2485575 | A * | 5/2012 | B65D 85/8043 |
| WO | 2011141532 | | 11/2011 | |
| WO | 2013117990 | A1 | 8/2013 | |

\* cited by examiner

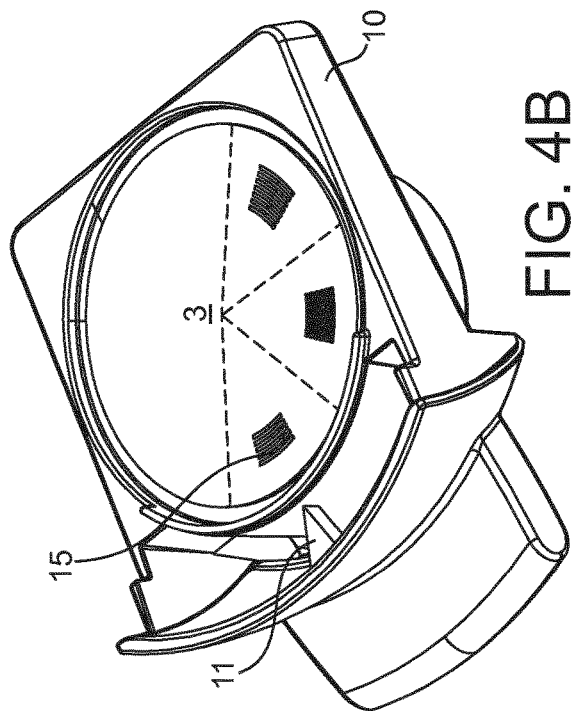
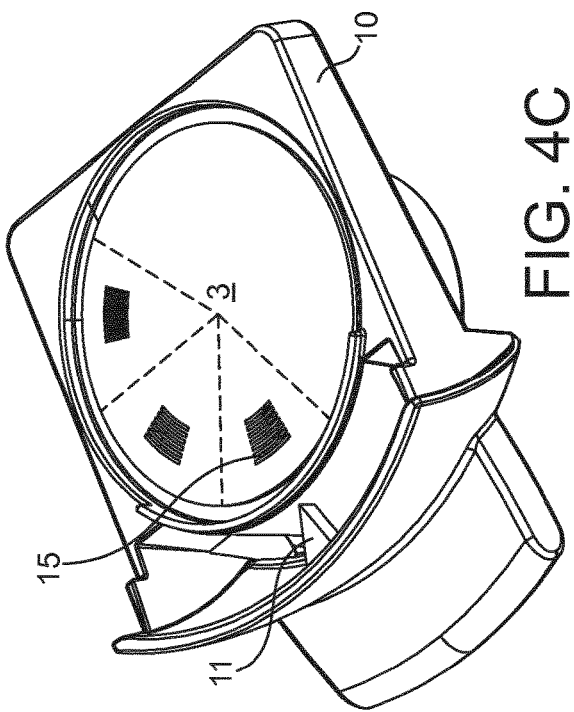
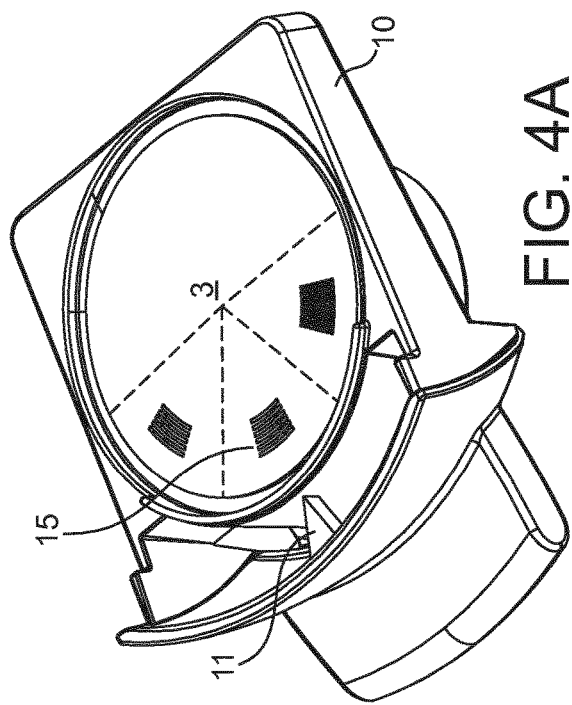
FIG. 4A
FIG. 4B
FIG. 4C

CAPSULE FOR PREPARING EDIBLE COMPOSITIONS

CROSS REFERENCE TO RELATED APPLICATIONS

The present application is a National Stage of International Application No. PCT/EP2014/062633, filed on Jun. 17, 2014, which claims priority to European Patent Application No. 13173326.3, filed Jun. 24, 2013, the entire contents of which are being incorporated herein by reference.

FIELD OF THE INVENTION

The present invention concerns an ingredient capsule for use in a food preparation machine, for instance in a liquid food preparation machine.

BACKGROUND OF THE INVENTION

Beverage preparation machines are well known in the food science and consumer goods area. Such machines allow a consumer to prepare at home a given type of beverage, for instance a coffee-based beverage, e.g. an espresso or a brew-like coffee cup.

Today, most beverage preparation machines for in-home beverage preparation comprise a system made of a machine which can accommodate portioned ingredients for the preparation of the beverage. Such portions can be soft pods or pads, or sachets, but more and more systems use semi-rigid or rigid portions such as rigid pods or capsules. In the following, it will be considered that the beverage machine of the invention is a beverage preparation machine working with a rigid or semi-rigid capsule.

The machine comprises a receptacle or cavity for accommodating said capsule and a fluid injection system for injecting a fluid, preferably water, under pressure into the capsule. Water injected under pressure in the capsule, for the preparation of a coffee beverage according to the present invention, is preferably hot, that is to say at a temperature above 70° C. However, in some particular instances, it might also be at ambient temperature, or even chilled. The pressure inside the capsule chamber during extraction and/or dissolution of the capsule contents is typically about 1 to about 8 bar for dissolution products and about 2 to about 12 bar for extraction of roast and ground coffee. Such a preparation process differs a lot from the so-called "brewing" process of beverage preparation—particularly for tea and coffee, in that brewing involves a long time of infusion of the ingredient by a fluid (e.g. hot water), whereas the beverage preparation process allows a consumer to prepare a beverage, for instance coffee, within a few seconds.

The principle of extracting and/or dissolving the contents of a closed capsule under pressure is known, and consists typically of inserting the capsule in a receptacle or cavity of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the extracted substance or the dissolved substance through the capsule. Capsules allowing the application of this principle have already been described for example in applicant's European patents no EP 1472156 B1, and EP 1784344 B1.

Machines allowing the application of this principle have already been described for example in patents CH 605 293 and EP 242 556. According to these documents, the machine comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

The machine further comprises a fluid tank—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element for circulating the water from the tank to the capsule, optionally through the heating element. The way the water circulates within the machine is e.g. selected via a selecting valve means, such as for instance a peristaltic valve of the type described in applicant's European patent application EP 2162653 A1.

When the beverage to be prepared is coffee, one interesting way to prepare the coffee is to provide the consumer with a capsule containing roast and ground coffee powder, which is to be extracted with hot water injected therein.

In many instances, the machine comprises a capsule holder for holding a capsule, which is intended to be inserted in and removed from a corresponding cavity or receptacle of the machine. When a capsule holder is loaded with a capsule and inserted within the machine in a functional manner, the water injection means of the machine can fluidly connect to the capsule to inject water therein for a food preparation, as described above. A capsule holder was described for example in applicant's European patent EP 1967100 B1.

Capsules have been developed for such an application of food preparation, and in particular for beverage preparation, which are described and claimed in applicant's European patent EP 1784344 B1, or in European patent application EP 2062831.

In short, such capsules comprise typically:
  a hollow body and an injection wall which is impermeable to liquids and to air and which is attached to the body and adapted to be punctured by e.g. an injection needle of the machine,
  a chamber containing a bed of roast and ground coffee to be extracted, or a soluble ingredient or mix of soluble ingredients,
  an aluminium membrane disposed at the bottom end of the capsule, closing the capsule, for retaining the internal pressure in the chamber.

The aluminium membrane is designed for being pierced with piercing means that are either integral with the capsule, or located outside of said capsule, for example within a capsule holder of the machine.

The piercing means are adapted for piercing dispensing holes in the aluminium membrane when the internal pressure inside the chamber reaches a certain pre-determined value.

Also, optionally, the capsule can further comprise means configured to break the jet of fluid so as to reduce the speed of the jet of fluid injected into the capsule and distribute the fluid across the bed of substance at a reduced speed.

Capsules of the prior art feature an injection wall or membrane (referred to as top membrane) which is to be pierced by a fluid injection element (e.g. needle) of a beverage preparation machine being part of a fluid system. When fluid is injected in the capsule compartment, a pressure is built up, which serves as an extraction means for extracting and/or dissolving ingredients contained inside the capsule, as described above. Such ingredients can be for instance a bed of roast and ground coffee. Alternatively or in combination with roast and ground coffee, the ingredients can comprise soluble ingredients, such as for instance beverage premixes.

In some of the known food and beverage preparation systems, it is possible to prepare several type of products, by setting the preparation parameters. Settings can be automatically selected by a recognition of the capsule by the machine, which is usually wireless (optical or magnetic for instance). However, such automatic recognition is not flexible, and it is impossible for the user to finely tune the machine, once the latter has recognized a capsule and adapted the corresponding product preparation parameters (temperature, volume, pressure, etc.). So far, when producers want to give a user the possibility to adapt the product preparation parameters, it is necessary to provide the machine with a user interface, typically a control panel on the machine, which comprises selector commands. In order to keep the machine cost as low as possible while offering a proper handling and sufficient flexibility in use and parameterization, machines are usually equipped with manual selector commands like for instance knobs, handles, rotating wheels, push or press buttons.

While such selector commands are practical and not too expensive, they require several steps for the user to choose and select the correct preparation settings.

It is therefore an objective of the present invention to provide a capsule comprising inexpensive means that allow a user to simply, quickly and reliably select at least one preparation parameter for the food product to be prepared out of said capsule, involving as few operation steps as possible.

SUMMARY OF THE INVENTION

The objectives set out above are met with a capsule for food or beverage preparation having a capsule body defining a compartment for containing a precursor ingredient, said capsule body being a volume with one symmetry plane or one symmetry axis so as to define at least two symmetrical volume segments, said capsule being suitable for coupling any of its body segments to a food or beverage preparation machine for injection of a mixing ingredient from said machine within said capsule, characterized in that said capsule comprises at least two codes each located in one body segment, each code carrying two different alternative values of a same beverage preparation setting.

The principle of the invention is that the capsule can be oriented by the user when it is inserted within the machine. Depending on the orientation of the capsule relative to the machine, one or another code of the capsule will be read, and the product preparation settings of the machine will be adapted. The capsule according to the invention is therefore a simple, efficient, and inexpensive means to provide the user with a control of the machine, without a need for a complex and costly control panel on the machine itself: the choice of a machine setting is done simply by orientating the capsule at the time it is inserted within the machine.

The capsule can be orientated and inserted directly into a corresponding capsule entry of the machine, or alternatively, the capsule can be placed in a capsule holder which is subsequently inserted into the machine. In the latter case, the capsule orientation is performed within the capsule holder, and in this case, the capsule holder preferably comprises a position indicator (e.g. a printed or embossed sign) which serves to align the code which is selected by the user.

In a preferred embodiment of the invention, the capsule body comprises side, top and bottom walls, and said codes are located across said top wall.

Also advantageously, the capsule body can be a frusto-conical volume having a vertical central symmetry axis. In this case, the user can insert the capsule for instance in a capsule holder having a corresponding frustoconical cavity, and then the user can rotate the capsule within the capsule holder.

In a preferred embodiment of the invention, each code comprises at least one printed or embossed line, or a series of superimposed printed or embossed lines, suitable for reading by an optical reader of the machine.

Preferably, the beverage preparation setting is the volume of food or beverage to be dispensed.

The invention is further directed to a food or beverage preparation system comprising a food or beverage preparation machine having an optical reader, and a capsule as described above.

BRIEF DESCRIPTION OF THE DRAWINGS

Additional features and advantages of the present invention are described in, and will be apparent from, the description of the presently preferred embodiments which are set out below with reference to the drawings in which:

FIGS. 4A, 4B, 4C are top perspective views of capsule loaded in the capsule holder of a beverage preparation machine, in three different setting positions;

DETAILED DESCRIPTION OF THE INVENTION

Figure 1:
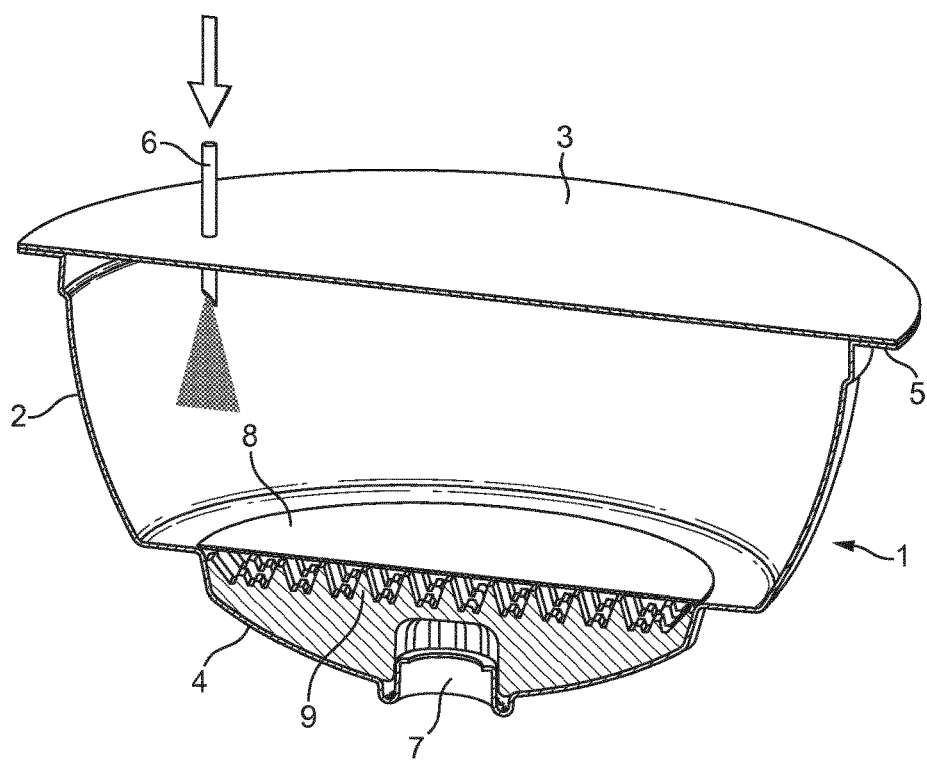
FIG. 1 is a cut perspective view of a capsule for preparation of a beverage product.

A capsule 1 according to the invention is represented in FIG. 1. It comprises a capsule body with side wall 2, a top wall 3, and a bottom wall 4. The top wall 3 is a pierceable membrane that is sealed onto peripheral upper edges 5 of the side wall 2. As illustrated in FIG. 1, the membrane 3 is pierceable by an injection needle 6 of the machine, which injects water under pressure, as a mixing ingredient into the interior of the capsule, where it mixes with a precursor ingredient (not shown) contained therein. The mix between the precursor ingredient and the mixing ingredient forms an end product. The product is the dispensed into a cup or other consumer container, through a dispensing opening 7 of the capsule bottom wall. Opening of the capsule is performed by a pierceable bottom membrane 8 that flexes down when water pressure inside the capsule increases (due to injection of said water inside the capsule), such that it contacts a piercing plate 9 placed thereunder. This opening principle of the capsule is described extensively in e.g. Applicant's European patent EP 1472156 B1.

The capsule can be made of any suitable material, for instance a plastic that is injected, or thermoformed, and having moisture and oxygen barrier properties. The top pierceable membrane is made with a mono- or multi-layer plastic film having preferably moisture and oxygen barrier properties. The bottom pierceable layer is preferably made of an aluminium, comprising a layer of thermoplastic for better sealing properties to the rest of the capsule plastic body.

The capsule body is generally frustoconical, with a greater cross section near the top of the capsule body. Said capsule body is a volume with one vertical symmetry axis VAS.

Figure 2:
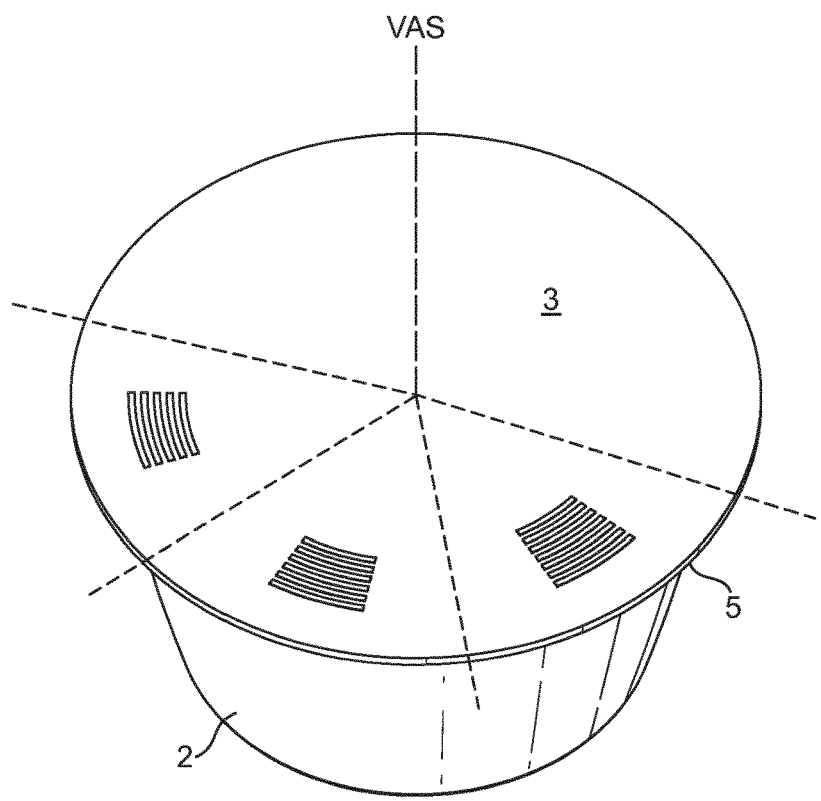
FIG. 2 is a top perspective view of a capsule having setting prints according to the invention.

According to the invention and as illustrated in FIG. 2, the top wall comprises a series of three codes 15 which are located each in a segment of the capsule. Segments are represented with dotted lines in FIG. 2. Each code carries one different alternative value of a same beverage preparation setting. All codes carry a code for beverage volume dispensing. As shown in FIG. 2, the code that is placed in the middle codes for the standard volume setting. In the example shown in FIG. 2, this standard setting code 15 comprises superimposed bars. The more bars printed as a code, the greater the volume to be dispensed into the consumer cup. According to the invention, the capsule comprises a second code, with only 5 superimposed bars, which therefore corresponds to a lower volume to be dispensed, and a third code which comprises 7 bars, i.e. which codes for a larger than standard volume to be dispensed.

Figure 3:
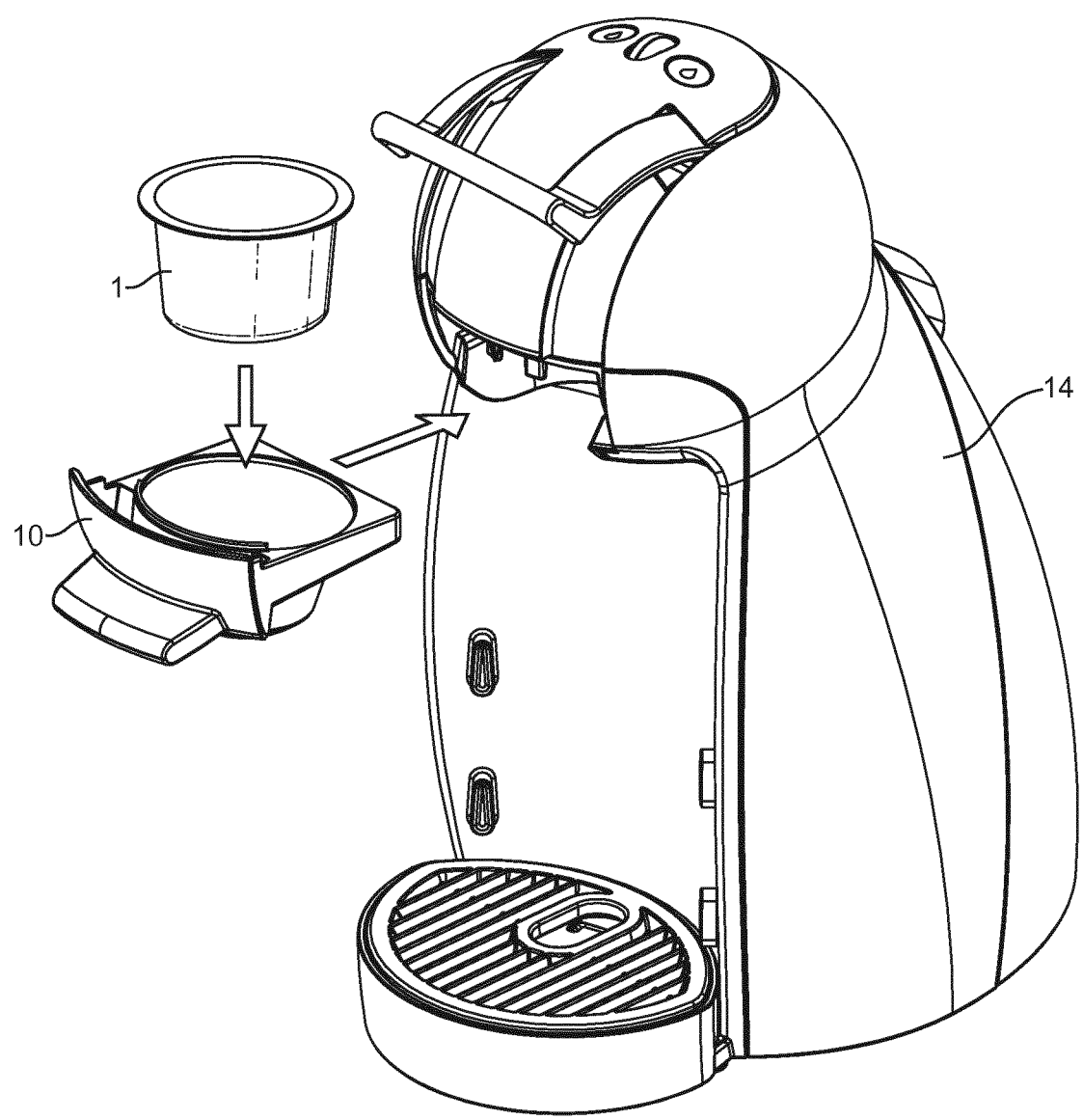
FIG. 3 is a perspective view of a beverage preparation system comprising a capsule and a machine according to the invention.

The capsule according to the invention is used as illustrated in FIG. 3: the used places the capsule into a capsule holder 10 of a beverage preparation machine, which is then inserted into a corresponding slot of the machine, as shown with arrows.

At the time the capsule is inserted into the capsule holder, the user can choose which volume setting he desires by rotating the capsule within the capsule holder, and aligning the selected code with a position indicator 11 of the capsule holder. The capsule can be rotated for selection of the standard code by aligning the middle code with the capsule holder indicator as shown in FIG. 4A, or alternatively the user can rotate the capsule differently within the capsule holder by aligning the lower volume code as shown in FIG. 4B, or as a third alternative the user can rotate the capsule within the capsule holder to select the greater dispensing volume as shown in FIG. 4C.

Figure 5B:
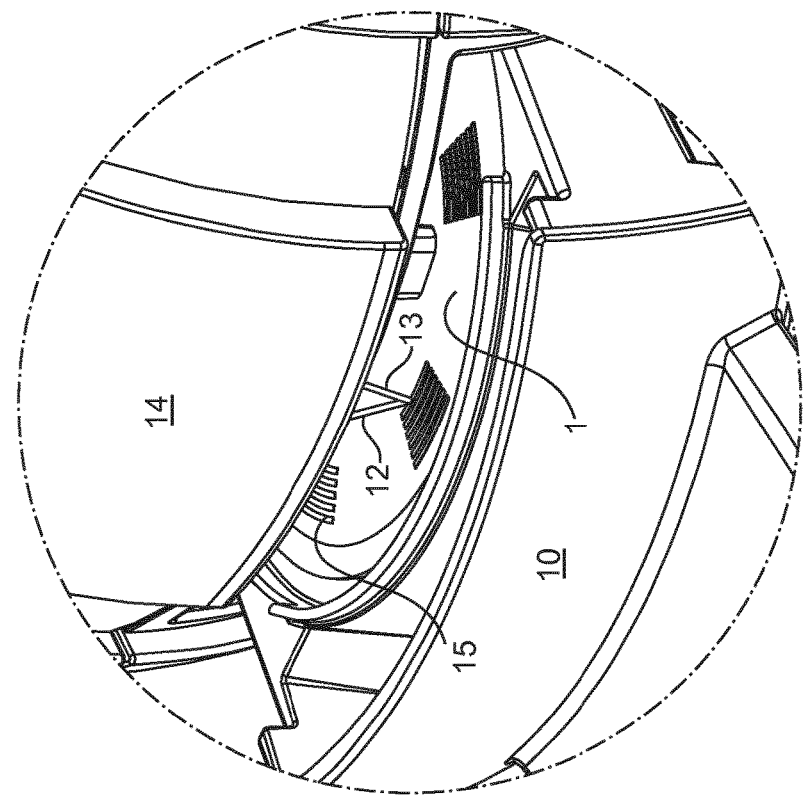
FIGS. 5A, 5B are perspective, respectively enlarged perspective, views of a machine with a capsule holder and capsule being loaded into the machine.
Figure 5A:
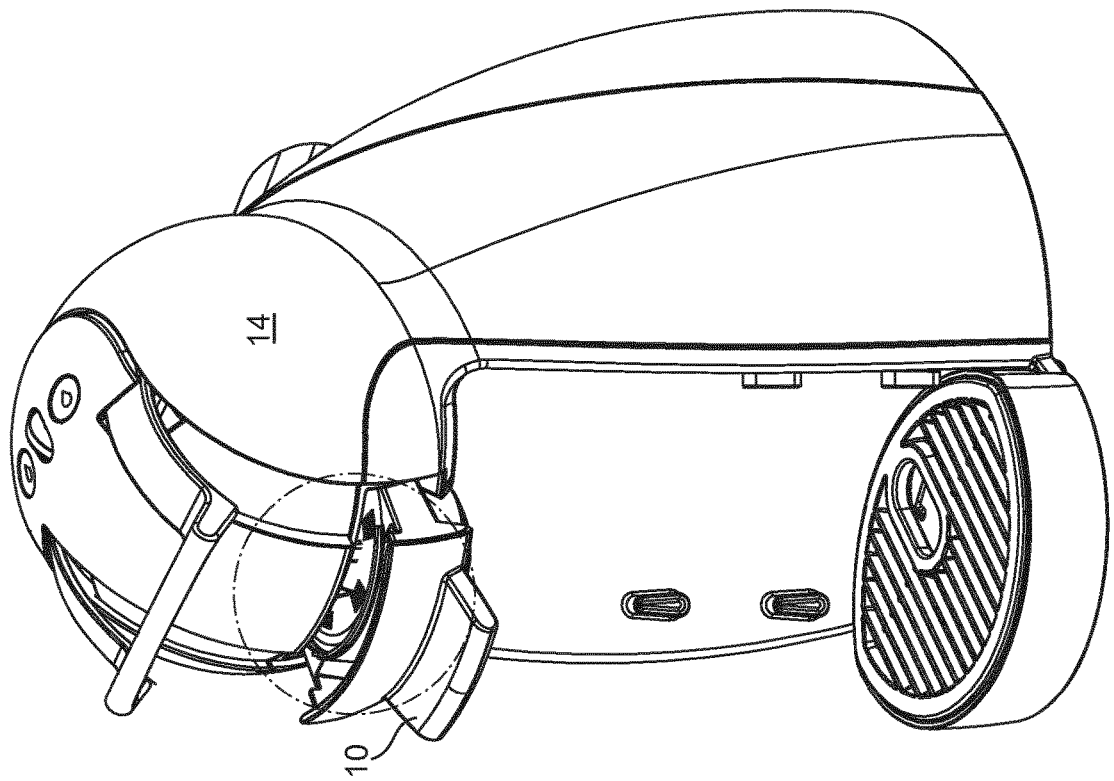

Once the user has placed the capsule in the capsule holder and has selected a volume setting by rotating the capsule therein as described above, the user can insert the loaded capsule holder within the machine, as shown in FIGS. 5A and 5B.

Once the user has placed a capsule in the capsule holder, and has selected the volume setting by rotating the capsule therein as described above, the user can insert the loaded capsule holder within the machine, as shown in FIGS. 5A and 5B.

As illustrated in FIGS. 5A and 5B, the machine comprises an optical reader 16, consisting of a laser emitting diode 17 and a photo sensor 18. The diode sends a sensing beam 12 towards the capsule surface, and the photo sensor captures the reflected light beam 13. The machine 14 therefore senses the number of bars in the code, and adapts the beverage preparation settings.

Figure 6A:
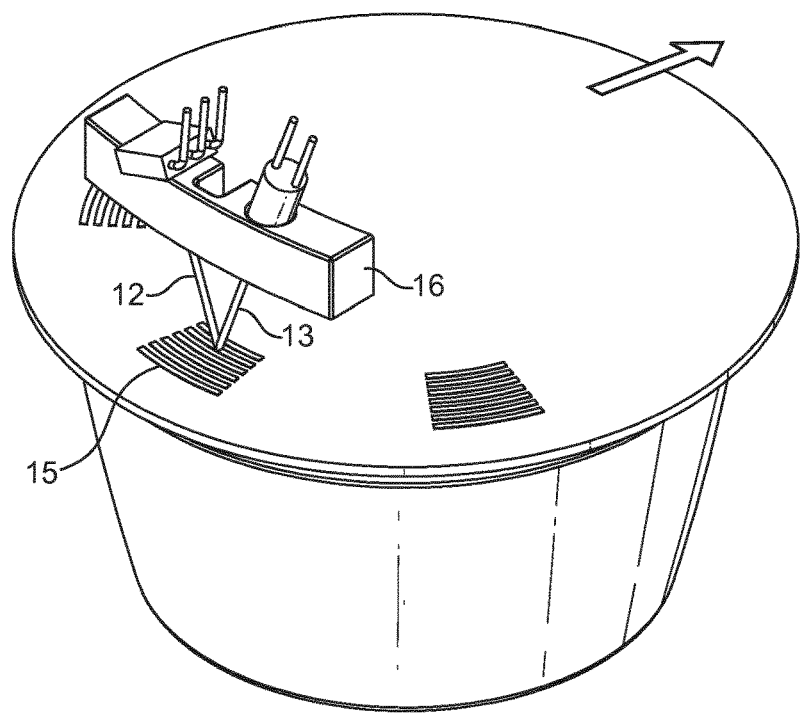
FIGS. 6A and 6B are top perspective, side, and respectively cut side, views of a beverage capsule and optical reader of a beverage machine according to the invention.
Figure 6B:
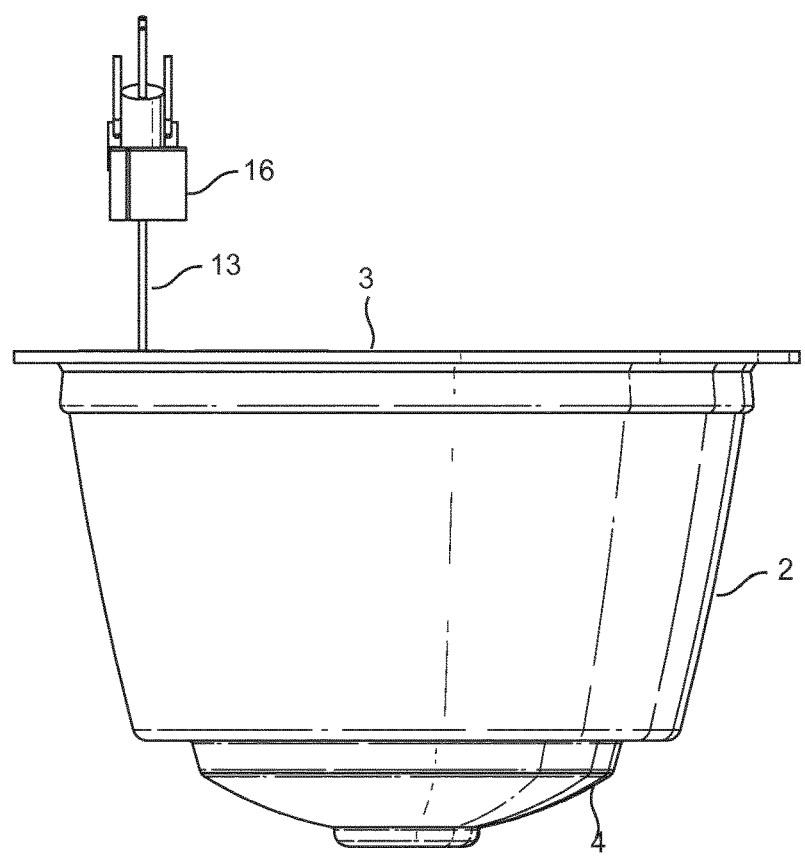

The details of the optical reader are shown in FIGS. 6A and 6B. as shown in FIG. 6A, the optical reader is located in the machine such that it can sense the code printed on the front half of the capsule. The direction of insertion of the capsule into the machine is illustrated in FIG. 6A with an arrow.

In a highly preferred embodiment of the invention, the optical reader is positioned in the machine such that the sensing beam 12 and the reflected beam 13 are directed in a plane that is perpendicular to the top wall 3 of the capsule which bears the code, as illustrated in FIG. 6B. Importantly, the position and the distance of the optical reader relative to the upper surface of the capsule is such that said optical reader can read the code that the user has aligned to the position indicator of the capsule holder.

The working principle of the optical reader is similar to the principle of a barcode reader. More precisely, it senses the variations of contrast in the zone of the code. Even more precisely the optical reader senses the presence of each bar of the code, which is interpreted by the machine as a beverage preparation setting, depending on the number of bars which are sensed once the full code is read. By inserting the capsule, the optical reader counts the number of bars and adapts the cup volume accordingly.

Importantly, the fact that each code is made of a series of superimposed bars, or out of one bar (for the smallest value of the coded setting), is advantageous because the speed of insertion of the capsule within the machine does not impact on the precision of reading by the optical sensor: the photo sensor reads only a series of light and dark items, which is converted into a series of bits by the decoding program of the machine, which is then translated directly into a value corresponding to the setting as selected by the user.

The invention as described above can be used independently from the fact that the capsule is inserted directly into the machine, or via a capsule holder as described above. What is important is the correct positioning of the code borne by the capsule relative to the sensor of the beverage machine.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation system comprising:
   a food or beverage preparation machine having an optical reader; and
   a capsule suitable for coupling any body segment of the capsule to the food or beverage preparation machine for injection of a mixing ingredient from the food or beverage preparation machine within the capsule, the capsule comprising:
   a capsule body comprising a top wall comprising an inner surface, the capsule body further comprising a bottom wall and a side wall extending from the bottom wall to the top wall, the inner surface of the top wall defines part of a compartment for containing a precursor ingredient, the top wall comprising a membrane sealed onto a peripheral upper edge of the side wall, the capsule body having a volume with one symmetry plane or one symmetry axis to define at least two symmetrical body segments of the capsule; and
   at least two codes, each of the at least two codes located on an outer surface of the top wall, the outer surface located on an opposite side of the top wall from the inner surface, each of the at least two codes code carrying one respective value of a beverage preparation setting for operating the food or beverage preparation machine,
wherein the at least two codes are different from one another such that the at least two codes carry different values of the same beverage preparation setting; and
wherein each of the at least two codes are arranged on the capsule such that only one of the at least two codes is read by the machine based on the orientation of the capsule relative to the machine.

\* \* \* \* \*